United States Patent [19]

Seth

[11] Patent Number: 4,921,328
[45] Date of Patent: May 1, 1990

[54] POLYCRYSTALLINE FERROELECTRIC FIBER

[75] Inventor: Vinay K. Seth, Alfred, N.Y.

[73] Assignee: Alfred University, Alfred, N.Y.

[21] Appl. No.: 357,763

[22] Filed: May 26, 1989

[51] Int. Cl.$^5$ ............................................. G02B 1/02
[52] U.S. Cl. ............................. 350/96.34; 350/96.29; 428/364; 501/35; 501/37
[58] Field of Search ............... 350/96.29, 96.30, 96.31, 350/96.32, 96.33, 96.34; 428/368, 379, 384, 388, 389, 364; 501/35, 36, 37, 38, 95

[56] References Cited

U.S. PATENT DOCUMENTS

| | | | |
|---|---|---|---|
| 4,460,696 | 7/1984 | Harada et al. | 501/37 |
| 4,504,113 | 3/1985 | Baak | 350/96.33 |
| 4,525,026 | 6/1985 | Elion | 350/96.30 X |
| 4,721,360 | 1/1988 | Murakami et al. | 350/96.34 |

OTHER PUBLICATIONS

Hirano et al, "Preparation of Stoichiometric Crystalline Lithium Niobate Fibers by . . . ", J. Am. Ceram. Soc., 72[4], Apr. 1989, pp. 707–709.

Primary Examiner—John D. Lee
Attorney, Agent, or Firm—Howard J. Greenwald

[57] ABSTRACT

An inorganic, polycrystalline, ferroelectric fiber with a diameter of from about 1 micron to 1 millimeter, a porosity of less than about 40 percent, a density of at least about 60 percent of theoretical density, and a carbonaceous material content of from about 0 to about 5 percent. The fiber consists essentially of grains of which substantially 100 percent are from about 0.01 to about 5.0 microns in size; the ratio of the size of the largest grain in the fiber to the smallest grain in the fiber is no greater than about 10.

20 Claims, 5 Drawing Sheets

POLYCRYSTALLINE FERROELECTRIC FIBER

FIELD OF THE INVENTION

A polycrystalline, ferroelectric fiber.

BACKGROUND OF THE INVENTION

Ferroelectric materials are well known. They are usually crystalline substances which have a permanent spontaneous electric polarization (electric dipole moment per cubic centimeter) that can be reversed by an electric field. See, e.g., pages 239-242 of Volume 5 of the "McGraw-Hill Encylopedia of Science and Technology,"(McGraw-Hill Book Company, New York, 1977), the disclosure of which is hereby incorported by reference into this specification.

Ferroelectric materials have found many uses. The piezoelectric effect of ferroelectrics finds numerous applications in electromechanical transducers. The large electrooptical effect (birefringence induced by an electric field) is used in light modulators. In certain ferroelectrics, light can induce changes of the refractive indices; these substances can be used for optical information storage and in real-time optical processors. The temperature dependence of the spontaneous polarization corresponds to a strong pyroelectric effect which can be exploited in thermal and infrared sensors. The high dielectric constants of these materials allows them to be used as dielectrics.

A ferroelectric material in fiber form could be used for many purposes. Thus, they may be used to prepare composites with polymers such as, e.g., epoxies, polyurethane, and the like; these composites may be used for piezoelectric, pyroelectric, electrooptic, and dielectric applications. Thus, e.g., they may be used in in-line fiber optic devices such as, e.g., devices for harmonic generation, electrooptic modulation, and the like. These fibers may be used in acoustic and acoustoopic devices. They may also be used a sensors; they can be chemically doped to make them semiconducting with dopants such as, e.g., iron, tungsten, manganese, yttrium, niobium and the like.

In a publication in April of 1989, by S. Hirano et al., entitled "Preparation of Stoichiometric Crystalline Lithium Niobate Fibers by Sol-Gel Processing with Metal Alkoxides," J. Amer. Ceram. Soc., 72[4] 707-709(1989), the preparation of sintered polycrystalline lithium niobate fibers was disclosed. Applicant invented his polycrystalline, ferroelectric fibers prior to April of 1989.

It is an object of this invention to provide a polycrystalline, ferroelectric fiber.

SUMMARY OF THE INVENTION

In accordance with this invention, there is provided an inorganic, polycrystalline, ferroelectric fiber with a diameter of from about 1 micron to 1 millimeter, a porosity of less than about 40 percent, a density of at least about 60 percent of the theoretical density, and a carbonaceous material content of from about 0 to about 5 percent. This fiber consists essentially of grains of which substantially 100 percent are from about 0.01 to about 5.0 microns in size; the ratio of the size of the largest grain in said fiber to the size of the smallest grain in said fiber is no greater than about 10.

DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

The process described in this patent application may be used to prepare polycrystalline, ferroelectric fibers which preferably consist essentially of at least three different elements, which have diameters of from about 1 micron to 1 millimeter, and which consists essentially of grains substantially all of which are from about 0.01 to about 5.0 microns large.

The fibers of this invention are polycrystalline. The term polycrystalline, as used in this specification, refers to a structure which is comprised of many crystals or crystallites intimately bonded together.

The fibers of this invention are ferroelectric. The term ferroelectric, as used in this specification, refers to a polycrystalline material that, over certain temperature ranges, has a natural or inherent deformation (polarization) of the electrical fields or electrons associated with the atoms and groups in the crystal lattice, resulting in a spontaneous dipole moment from the interaction of electric dipoles in the material. The ferroelectric effect is well known to those skilled in the art and is discussed, e.g., on pages 964-973 of W. D. Kingery et al.'s "Introduction to Ceramics," Second Edition (John Wiley and Sons, New York, 1976), the disclosure of which is hereby incorporated by reference into this specification.

In one preferred embodiment, illustrated in the Example, the fiber of this invention is comprised of at least five different elements.

The fiber of this invention is inorganic. As used in this specification, the term inorganic refers to a composition which contains less than about 5 percent of carbonaceous material. The term carbonaceous material includes both elemental carbon and carbon compounds. It is preferred that the fiber of this invention contain less than about 3 percent of carbonaceous material.

At least about 95 weight percent of the fiber of this invention said fiber consists of crystals with one or more of the following formulas.

The crystal may be of the formula $ABO_3$, wherein A is an atom selected from the group consisting of lithium, sodium, potassium, lanthanum, gadolinium, calcium, strontium, barium, lead, bismuth, yttrium, cerium, praseodymium, neodymium, samarium, europium, terbium, dysprosium, holmium, and cadmium, atoms, and mixtures thereof; and wherein B is an atom selected from the group consisting of tin, titanium, zirconium, hafnium, vanadium, niobium, magnesium, tantalum, tungsten, molybdenum, manganese, antimony, chromium, nickel, iron, zinc, scandium, silicon, germanium, tellurium, aluminum, and cobalt atoms, and mixtures thereof.

The crystals may be of the formula $A_yA'_z[A''_w]_x)(B_2B'_8)O_{30}$, wherein A' and A'' are each atoms selected from the A group of atoms described above, provided that A'' differs from both A and A'; wherein w, y, and z are each positive numbers; wherein w is from 0 to 4, y is from 0 to 5, and z is from 0 to 5; wherein x is from 0 to 1; and wherein B' is independently selected from the B group of atoms described above.

The crystals may be of the formula $A_aB_bO_c$ wherein a is from 2 to 9, b is from 1 to 8, and c is from 6 to 27.

The fiber may contain crystals which all have the same formula. Alternatively, it may contain crystals with several formulae within the scope of the ones described above.

In one preferred embodiment, illustrated in the Example, mixtures of both the A atoms and B atoms are used in the fiber. In the embodiment illustrated in the Example, which has the perovskite structure, A is a mixture of lead and lanthanum atoms, and B is a mixture of zirconium and titanium atoms.

In one preferred embodiment, the material in the fiber has the perovskite crystal structure, and is of the formula $ABO_3$. This perovskite crystal structure is well known to those skilled in the art and is discussed, e.g., on pages 67–68 of the aforementioned Kingery et al. book.

In another preferred embodiment, the material in the fiber has the tungsten bronze crystal structure, and is of the formula $(A_2A'_4[A''_4]_x)(B_2B'_8)O_{30}$. The tungsten bronze crystal structure is discussed, e.g., in P. B. Jamieson et al.'s "Ferroelectric Tungsten Bronze Type Crystal Structures In Barium Strontium Niobate," J. Chem. Phys. 48, 5048–5057 (1968), the disclosure of which is hereby incorporated by reference into this specification.

In one preferred embodiment, the fibers of this invention preferably consist essentially of a solid solution of one or more of said A atoms and one or more of said B atoms. A solution is a homogeneous or single-phase, variable composition mixture of one substance (the solute) in another (the solvent) in which the former is dispersed as separated molecules, ions, or atoms in the latter. When both the solvent and solute are solid, a solid solution results. As is known to those skilled in the art, one may have an interstitial solid solution in which crystals contain a second component in their interstices. One may also have an ordered solid solution, i.e., a substitutional solid solution with a preference by each of the components for specific lattice sites. One also may have a substitutional solid solution containing crystals with a second component substituted for solvent atoms in the basic structure. These solid solutions are described in, e.g., Lawrence H. Van Vlack's "Elements of Materials Science and Engineering," Fifth Edition (Addison-Wesley Publishing Company, Reading, Massachusetts, 1985), the disclosure of which is hereby incorporated by reference into this specification.

By way of illustration and not limitation, some of the combinations of A and B atoms which may be present in applicants' fibers are described below. Thus, the fibers may include lead, titanium, and zirconium; see, e.g., U.S. Pat. No. 2,708,244 of Jaffe which describes transducer elements composed of solid solutions of lead titanate and lead zirconate in various proportions. Thus, e.g., the fibers may include lead, lanthanum, zironcium, and titanium; see, e.g., U.S. Pat. No. 2,708,244 which describes a "PLTZ" electrooptic ferroelectric ceramic material of a lead lanthanum zirconate titanate solid solution. Thus, e.g., the fibers may include lead titanate; strontium titanate; barium titanate; lithium niobate; potassium niobate; sodium niobate; lithium tantalate; lead zirconate; $(Ba_{1-x}Sr_x)TiO_3$, wherein x is from 0 to 1; $(Pb_{1-x}Ba_x)TiO_3$, $(Pb_{1-x}Sr_x)TiO_3$, $Pb(Mg_{0.33}Nb_{0.67})O_3$, and the like.

The fibers of this invention consist essentially of grains, substantially all of which are from about 0.01 to aout 5.0 microns large. The term grain, as used in this specification, refers to a single crystallite of the multitude of crystallites in the fiber; the crystallite is comprised of a polycrystalline material. The term crystallite refers to a grain.

The grain size of the grains in applicants' fibers may be determined by means well known to those skilled in the art; see, e.g., pages 119–122 of said Van Vlack book. It is preferred to measure the grain size by the well known intercept method in which random straight lines are drawn on a micrograph (scanning electron). The distance between two consecutive grain boundaries on the straight line is recorded. This distance is averaged and multiplied by the scale factor determined from the magnification at which the scanning electron micrograph was obtained. See, e.g., E. Underwood's "Quantitative Stereology," (Addison-Wesley, New York, 1970), at pages 23 et seq., the disclosure of which is hereby incorporated by reference into this specification.

In one preferred embodiment, the grain size of the grains in the fibers of this invention is from about 0.1 to about 0.3 microns.

The particle size distribution of the grains in applicant's fiber is relatively uniform. In general, the ratio of the size of the largest grain in the fiber to the size of the smallest grain in the fiber is no greater than about 10.

The fibers of this invention preferably are relatively dense. They have a density which is at least about 60 percent of the theoretical (X-Ray) density. As is known to those skilled in the art, the theoretical density is the density of a stoichiometric single crystal of the same exact composition; the theoretical density is calculated from the number of atoms per unit cell and the measurement of the lattice parameters. See A.S.T.M. Standard Test C859, the disclosure of which is hereby incorporated by reference into this specification. In one preferred embodiment, the density of the fiber is at least about 90 percent of its theorteical density. In another embodiment, the density is at least about 95 percent of the theoretcal density.

The fibers of this invention have a diameter of from about 1 micron to about 1 millimeter and, preferably, from about 10 to about 100 microns. The length of the fibers may range from about 1 millimeter to in excess of 12 inches.

The fiber of this invention generally contains less than about 5 percent of carbonaceous matter, either in the form of elemental and/or combined carbon.

The fibers of this invention are made by a process in which a sol is first prepared, a fiber is then drawn from the sol, and the fiber is then heat treated.

In the first step of the process of this invention, a sol is prepared. This sol may be prepared by the methods disclosed by S. R. Gurkovich and J. B. Blum, "Ultrastructure Processing of Glasses, Cermaics and Composites," edited by L. L. Hench and D. R. Ulrich (John Wiley and Sons, New York, New York, 1984), at pages 152–160, and by K. D. Budd, S. K. Dey, and D. A. Payne in the "Proceedings of the British Ceramic Society," Volume 36, pages 107–121 (1985). The disclosures of these publications are hereby incorporated by reference into this specification.

In the first step of the process of this invention, one or more compounds of the A atom(s) are mixed with a solvent. The solvent is chosen so that it will be a cosolvent for both the compound(s) of the A ions and the compound(s) of the B atoms. The compounds of the B atoms, however, are preferably alkoxides. Some suitable cosolvents for various systems include, e.g., 2-methoxyethanol, ethanol, methanol, xylene, and the like.

After one has identified the stoichiometry of the fiber he wishes to prepare, a stoichiometric amount of the A compound(s) is measured out and charged into a reaction vessel.

The A compound must be soluble in the cosolvent. By way of illustration and not limitation, suitable A compounds for various applications include lead acetate hydrate, lanthanum acetate hydrate, barium acetate hydrate, strontium acetate hydrate, lithium acetate hydrate, and compounds of the formula $A(OR)_v$, wherein v is from about 1 to about 6 and R contains from about 1 to about 18 carbon atoms.

The A compound(s) is charged to a reaction flask, and then a sufficient amount of solvent is added to the flask to dissolve the A compound(s). The solution is then heated to a boil and maintained at a boil for from about 5 to about 60 minutes until a clear solution is obtained. When a lead compound is present as one of the A compounds, the reaction mixture must be at a temperature of at least about 90 degrees centigrade.

Into a separate reaction flask is charged a stoichiometric quantity of the B compound. If more than one of the B compounds is to be used to prepare the fiber, then it is preferred to add each of them to separate flasks, dissolve each of them with the cosolvent, and then add each of the solutions thus formed separately to the flask containing the solution of the A compound(s). The B compounds are in the form of alkoxides. They are of the formula $B(OR)_y$. It is preferred that R contain at least about 3 carbon atoms. It is more preferred that R contain at least 4 carbon atoms. It is most preferred that R contain at least 5 carbon atoms. Applicant believes that the presence of longer carbon chains in the compound increases its fiber-forming ability.

Suitable alkoxide compounds include zirconium n-propoxide, titanium n-propoxide, niobium n-propoxide, zirconium n-butoxide, titanium n-butoxide, tantalum n-butoxide, niobium n-butoxide, and the like.

A sufficient amount of the cosolvent must be added to and mixed with the alkoxide compound(s) so that a solution which is sufficiently dilute to pour into the batch will be formed. If the solution of the B compound is not dilute enough, it might crystallize and/or form aggregates upon addition to the solution of the A compound.

The solution of the alkoxide compound is added to the solution of the A compound and mixed therewith. In one embodiment, prior to such addition, the cosolvent and the alkoxide compound are separately refluxed for at least about 15 minutes until a substantially clear solution of reduced volume is obtained; in this embodiment, the clear solutions thus obtained are then added to the A compound. In another embodiment, a mixture is prepared by stirring the cosolvent with the B compound, the mixture of the alkoxide compound is added to the A compound for complexation; thereafter, the reaction mixture is heated to boiling and maintained at a boil until a clear solution results. Thus, one will generally reach the clear solution end point after from about 5 to about 60 minutes of boiling the mixture.

After the alkoxide complex has reached its end point, it is allowed to cool to ambient temperature. Thereafter it is hydrolyzed with a mixture of dilute mineral acid, diluted in water and cosolvent. In some cases just the moisture from air is enough so no hydrolyzing agent be added.

The dilute mineral acid used in the hydrolysis can be any suitable mineral acid such as nitric acid, hydrochloric acid, and the like. It is generally used in dilute form, at a concentration of from about 0.01 to about 1.0 molar. At least about 0.0003 parts of the dilute mineral acid are mixed with each part of the cosolvent, and the mixture of the cosolvent and the dilute acid is then preferably added dropwise to the reaction mixture.

If, prior to the hydrolysis, the reaction mixture is not in a plastic flask, it is preferred to transfer it to a plastic flask. The reaction mixture formed during the hydrolysis will tend to stick to a glass vessel.

The mineral acid/cosolvent mixture is generally added to the reaction mixture over a period of from about 10 to about 30 minutes, with stirring. The hydrolysis reaction forms a sol, which is thereafter heated and drawn into fibrous form.

The sol used to draw applicants' fibers contains the A atom(s) and the B atom(s) in the stoichiometry needed to produce the desired fibers. It generally has a viscosity of from about 1 to about 50 centipoise. Viscosity is measured with an Ostwald Dropping Pipet (avaiable from Fischer Scientific, Rochester, New York, item number 13–695, the Fischer 88 catalog). The viscosity measurement technique with this device is well known to those in the art and is described in, e.g., A. Findlay's "Introduction to Physical Chemistry," Third Edition (Longmans, Green and Co., London, England, 1953), at pages 103–107, the disclosure of which is hereby incorporated by reference into this specification.

The sol produced is clear without any form of precipitation. It is a crosslinked polymeric sol. Without wishing to be bound to any particular theory, applicant believes that at least about 75 weight percent of the sol is comprised of oligomers whose maximum size is less than about 500 angstroms.

After the sol has been provided in the first step of this process, it is then heated until its volume is reduced to a volume of from about 10 to about 50 percent of its initial volume. It is preferred to heat the sol to a temperature in excess of the boiling point of the solvent until the required amount of evaporation has taken place.

The product produced by this evaporation generally has a viscosity of at least about 0.7 poise.

One means of determining whether the gel formed is suitably viscous is to stick a glass rod into the mixture and withdraw it; when a fiber forms as the rod is removed, and it sticks onto the rod, the viscosity of the reaction mixture is within the desired range.

The gel produced by the evaporation step is fiber-forming. It can be made into fiber by any of the means known to those skilled in the art. Thus, it may be drawn into fiber form. Thus, it may be spun into fiber.

The fiber made in the process of this invention has a ratio of length to diameter of at least about 100/1.

Spinning is the process whereby a polymeric material, temporarily fluid in nature, is extruded from one or more small orifices and then is returned to the solid state in the form of a fiber. It is described in, e.g., pages 653-655 of Brage Golding's "Polymers and Resins" (D. Van Nostrad Company, Inc., Princeton, New Jersey, 1959), the disclosure of which is hereby incorporated by reference into this specification).

After the fibers have been drawn and/or extruded, they are heated to decarboxylate them and to increase their density. In general, the heating will continue until: (1) the fibers contain less than about 5 percent, by weight of fiber, of carbonaceous material selected from the group consisting of elemental carbon, organic compounds, and mixtures thereof, (2) the porosity of the fibers is less than about 40 percent. The porosity and the carbonaceous material content of the fiber may be determined in accordance with standard procedures. Thus, e.g., one may measure the density of the fiber, calculate the theoretical density, determine the ratio of the two, and then calculate the porosity.

In one embodiment, the fibers are heated in air while on a an inert substrate such as platinum foil, gold foil, and the like. The inert substrate should not stick to the fiber.

In another embodiment, the fibers are heated by hanging them from an inert support while they are subjected to heat treatment. Thus, by way of illustration, one may suspend the fibers on a alumina rod supported by the lips of a crucible. Other suitable arrangements will be apparent to those skilled in the art.

In another embodiment, not shown, the sol is extruded through an orifice to form fiber, and the extruded fiber as formed is taken up upon a rotating takeup device.

EXAMPLE OF ONE PREFERRED EMBODIMENT

Figure 1:
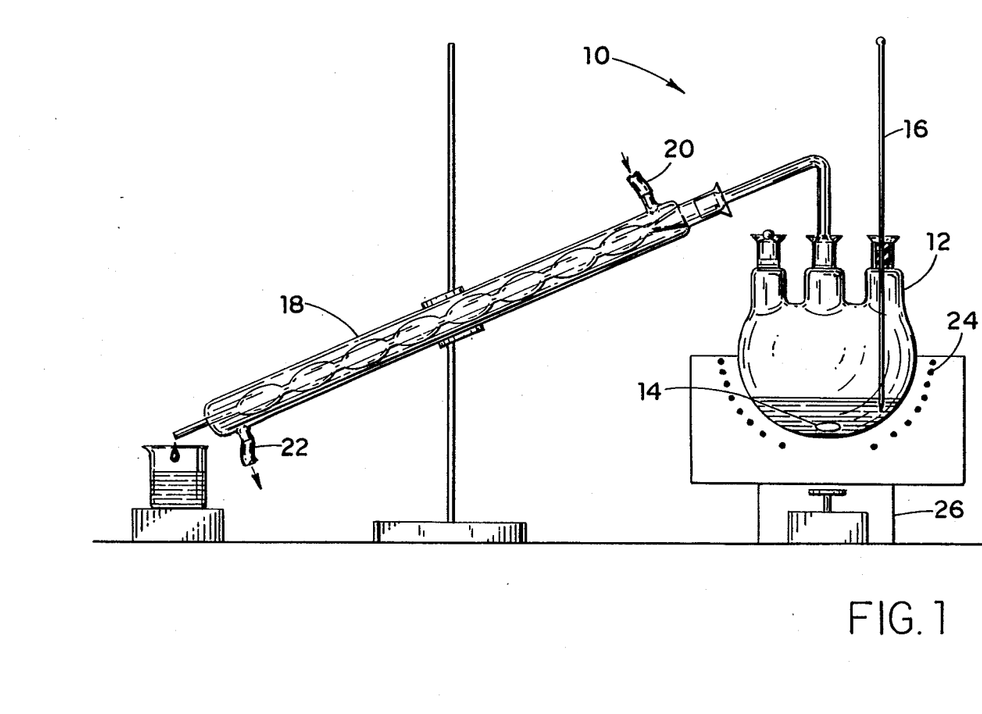
FIG. 1 illustrates an apparatus which may be used to synthesize a preferred fiber of the invention.

FIG. 1 illustrates an apparatus for preparing the alkoxide complex of the process. Apparatus 10 is comprised of three-neck flask 12 equipped with magnetic stirrer 14, thermometer 16, and condenser 18 which contains water inlet 20 and water outlet 22. The flask 12 is heated by a constant temperature mantle 24 which sits upon a stirring plate 26.

Figure 2:
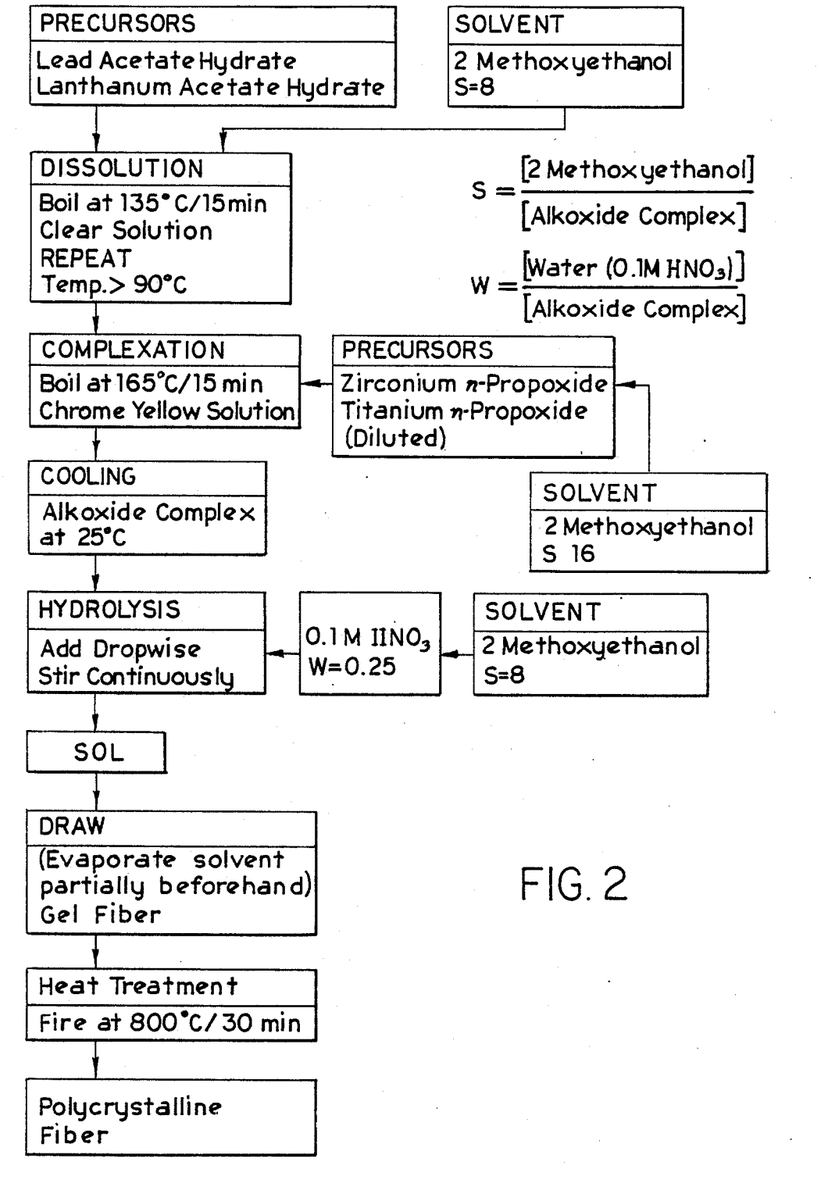
FIG. 2 is a flow diagram depicting the synthesis of a preferred fiber of the invention.

The preparation of one preferred embodiment of the invention is illustrated in FIG. 2. In this preferred embodiment, the starting materials were obtained from Alfa Products, 152 Andover Street, Danvers, Mass. The reactants used were zirconium n-propoxide (lot number 88733, molecular weight of 327.56, density of 1.05 grams per cubic centimeter), titanium n-propoxide (lot number 77141, molecular weight of 284.25, and density of 0.955 grams per cubic centimeters) lead acetate hydrate (lot number 400175, molecular weight of 379.33, density of 2.55 grams per cubic centimeters), lanthanum acetate hydrate (lot number 15299, molecular weight of 316.04), 2-methoxyethanol (lot number 12340, molecular weight of 76.09, density of 0.9663 grams per cubic centimeters), and fuming nitric acid (lot number 302713). The fuming nitric acid was diluted with a sufficient amount of water to prepare the 0.1 molar solutions used in this process.

Into three-necked flask 12 were charged 7.053 grams of lead acetate and 0.48 grams of lanthanum acetate; thereafter, 12.6 milliliters of 2-methoxyethanol were added. The mixture was stirred, heated to a temperature of 135 degres centigrade, and maintained at this temperature with stirring for 15 minutes until the color of the solution became clear, changing from its original white color. Thereafter, another 12.6 milliliter portion of the 2-methoxyethanol solvent was added to the reaction mixture, and stirring continued while the mixture was again heated at 135 degrees centigrade for 15 minutes. The temperature of the reaction mixture was then reduced to about 100 degrees centigrade.

Into a separate flask, not shown in FIG. 2, was charged 1.987 grams of the titanium n-propoxide. To this propoxide was added 8.75 milliliters of the 2-methoxyethanol, and the mixture was stirred with a glass rod under ambient conditions.

Into a separate flask was charged the zirconium alkoxide reactant. The material received from the vendor had less than the stated amount of zirconium in it, and thus a correction factor of 1.35 was used to insure that the stoichiometric amount of the desired zirconium atoms were present in the mixture. A corrected weight of 5.742 grams of the zirconium n-propoxide was charged to the flask, and 16.25 milliliters of the 2-methoxyethanol were then added to this reactant and stirred.

The zirconium n-propoxide solution was added to the reaction mixture first with stirring; during this addition, the temperature of the mixture was about 100 degrees centigrade. Thereafter, the titanium n-propoxide solution was added to the reaction mixture with stirring.

Thereafter the temperature of the reaction mixture was raised to 165 degrees centigrade and then maintained at this temperature for 15 minutes while the reaction mixture was stirred; during this time, the mixture changed color to a chrome yellow solution.

The reaction mixture was allowed to cool to ambient temperature. Thereafter, it was transferred from glass reaction flask 12 to a plastic container (not shown).

A 0.1 molar solution of nitric acid was made by diluting the fuming nitric acid with distilled water. Thereafter, 0.09 milliliters of this 0.1 molar solution of acid and 12.6 milliliters of the 2-methoxyethanol were mixed to form the hydrolyzing agent.

All of the hydrolyzing agent was added dropwise to the reaction mixture over a period of 10 minutes while the reaction mixture was under ambient conditions. During the addition of the hydrolyzing agent, the mixture was continuously stirred.

The reaction product at this stage was a sol. It had a a density of 1.299 grams per cubic centimeter.

The sol reaction product was then transferred into a porcelain crucible and heated under atmospheric pressure to a temperature of 130 degrees centigrade for 30 minutes. This heating reduced its volume by about 25 percent. A sticky sol was produced by this treatment.

The sol so produced was a viscous, fiberizable mass. The sol had a light brown color, and it appeared to have a viscosity of at least about 0.7 centipoise. Fibers were drawn from this mass by inserting and withdrawing a glass rod into it. The length of the fibers so drawn ranged from 1 to 12 inches, with the average length being about 6 inches. The average diameter of these fibers was from about 25 to about 50 microns.

These fibers were placed onto a platinum foil. Thereafter the fibers were heated in air to a temperature of 800 degrees centigrade for 30 minutes in order to densify and decarboxylate them. The sintered fibers so produced appeared to be dense. The grains in the sintered fibers ranged from about 0.1 to about 0.3 microns in size.

USES OF THE FERROELECTRIC FIBERS

The polycrystalline, ferroelectric fibers of this invention will have many uses which will be readily apparent to those skilled in the art.

In one embodiment, the ferroelectric fibers of this invention can be used to prepare a transversely reinforced piezoelectric composite. U.S. Pat. No. 4,613,784 of Haun et al., the disclosure of which is hereby incorporated by reference into this specification, describes A PZT glass-polymer composite material which comprises: (1) a matrix of a polymer, (2) a plurality of generally parallel PZT-rods aligned in the direction of a poling electric field secured in the matrix of the polymer, (3) means for electrically poling the plurality of PZT-rods in the matrix of the polymer, (4) a first plurality of glass fibers aligned in a direction perpendicular to the plurality of PZT-rods, and (5) a second plurality of glass-fibers aligned in a direction perpendicular both the to the direction of the PZT-rods and to the direction of the first plurality of glass fibers. The composition of the Haun et al. patent may be modified by substituting for the PZT-rods described in such patent one or more of the polycrystalline, ferroelectric fibers of this invention.

In another embodiment, the transversely reinforced piezoelectric composite described above is prepared in accordance with the procedure described above, with the exceptions that: (1) one may use PZT rods(fibers) and/or any of the fibers described in this specification(such as perovskites and/or tungsten bronzes), and (2) one may omit the use of glass fibers.

In another embodiment, the fibers of this invention are composited with epoxy resin and/or polyurethane and are used to prepare an electrooptic composite.

As will be apparent to those skilled in the art, in addition to producing piezoelectric composites, one may also produce pyroelectric composites with the fibers of this invention by conventional means. Thus, by way of illustration, one may prepare fibers of strontium doped barium titanate and composite such fibers with epoxy resins and/or glass fibers.

In another embodiment, fiber sensors which are semiconductive may be made by preparing doped compositions. Thus, by way of illustration, one may use dopants such a manganese, iron, tungsten, yttrium, niobium etc. to dope the perovskite type materials and to prepare compositions from which fibers can be drawn. In general, the drawn fibers must be heat treated at a temperature of at least 300 degrees centigrade before the fibers exhibit substantial semiconductivity.

In this embodiment, the dopant used is a variable valence cation which is capable of existing in more than one valence state. Such suitable cations include iron, manganese, tungsten, chromium, copper, nickel, vanadium, niobium, and the like. The preferred variable valance cations are selected from the d block of the periodic table and are preferably selected from the group consisting of iron, manganese, tungsten, and mixtures thereof. In general, less than about 5 mole percent of such variable valence cation is added to the reaction mixture.

The dopant is preferably mixed with the other reagents during the complexation stage of the process. After the fibers are drawn, the drawn fibers are sintered in order to provide a an insultaing grain boundary. In general, the fibers are heated at a temperature of at least about 300 degrees centigrade for at least about 30 minutes.

In yet another embodiment, a semiconductive ferroelectric fiber which has a porosity of from about 5 to about 40 percent is prepared; and this fiber may be used as a sensor. The porosity of the fiber may be controlled by controlling the time and temperature of sintering. Alternatively, one may control the porosity of the fiber by the use of organic materials which are soluble in the sol but which burn off only at relatively high temperatures.

In yet another embodiment, one may control porosity for anisotropic scattering and adjustable dielectric constant applications. Thus, e.g., porosity may be controlled by controlling the temperature and time of sintering.

Figure 3:
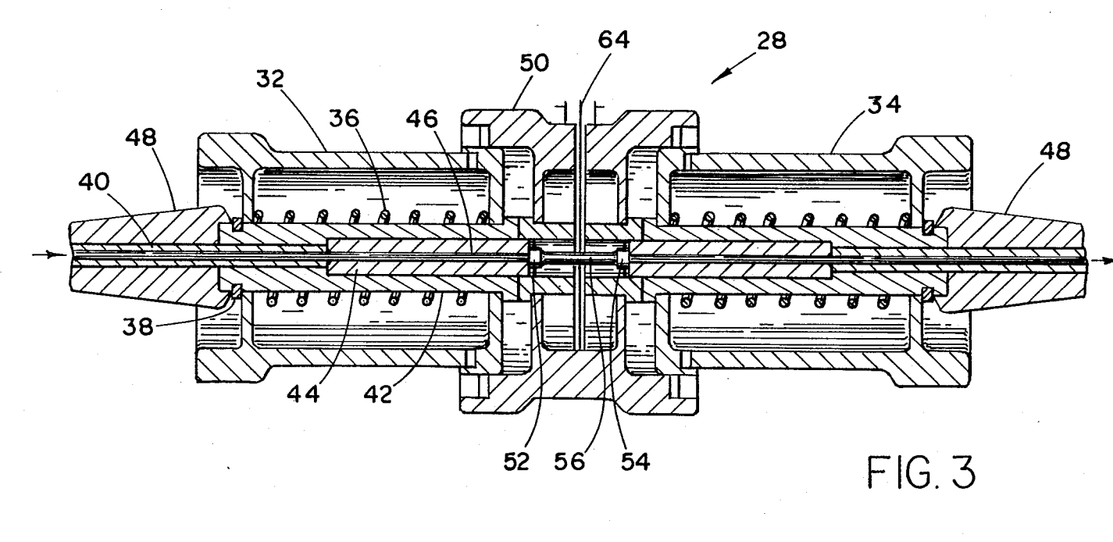
FIG. 3 is a schematic of a novel electrooptic modulator.

A novel electrooptic modulator comprised of applicants' novel fiber is shown in FIG. 3. Referring to FIG. 3, modulator 28 is comprised of coupling connectors 32 and 34. These coupling connectors are well known to those skilled in the art. Thus, e.g., one may use a connector such as an Amphenol connector(Amphenol 953 Series, available from the Amphenol Fiber Optics Products, Lisle, Illinois). For the sake of simplicity, the components of this connector are identified by number only on the left hand side of FIG. 3.

Each of coupling connectors 32 and 34 are comprised of spring 36, retaining ring 38, cladding 40, body 42, ferrule 44, optical fiber 46, and boot 48. In the embodiment illustrated in FIG. 3, connectors 32 and 34 are operatively and electrically connected to optical fiber receptacle 50. Receptacle 50 is comprised of micropolarizer 52, microanalyzer 54, and connected to components 52 and 54 is poled ferroelectric fiber 56.

The polycrystalline ferroelectric fiber used as a modulator may be poled by means well known to those skilled in the art. Thus, e.g., electrodes are deposited on the outside surface of the fiber by, e.g., evaporating metal onto the fiber. See, e.g., FIG. 4 wherein metallic electrodes 58 and 60 are deposited onto fiber 56. Conventional means of depositing electrodes upon the fiber surface may be used.

Figure 4:
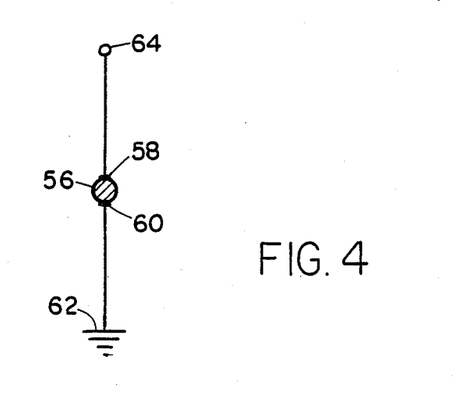
FIG. 4 is a cross-sectional view of the polycrystalline, ferroelectric fiber used in the device of FIG. 3.

A cross-section of poled fiber 56, showing its orientation in fiber receptacle 50, is illustrated in FIG. 4. Electrodes 58 and 60 are connected to the top and bottom, respecively, of fiber 56. Electrode 60 is connected to ground 62. Electrode 58 is connected to point 64, to which a modulating signal is introduced.

Figure 5:
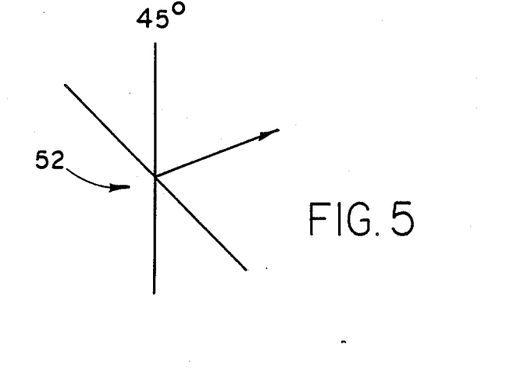
FIGS. 5 and 6 show the orientations of the micropolarizer 52 and the microanalyzer 54 of the device of FIG. 3.
Figure 6:
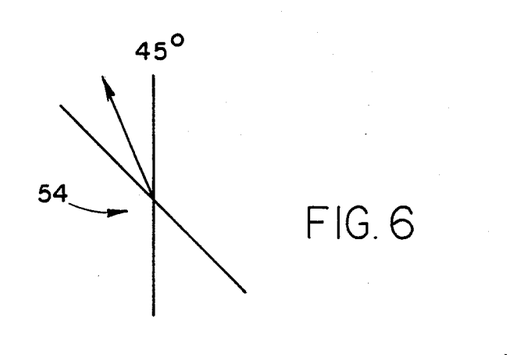

Once the electrodes have been deposited upon the fiber surface, a high voltage direct current (d.c.) electric field must be applied across the diameter of the fiber to pole the fiber. In general, the voltage used should be at least about 10 kilovolts per centimeter diametrically applied to the fiber. FIG. 5 shows the orientation of micropolarizer 52 in the device. FIG. 6 shows the orientatin of microanalyzer 54 in the device.

In the operation of the device of FIGS. 3, 4, 5, and 6, a poled ferroelectric fiber 56 is provided. Poled fiber 56 contains a first end and a second end. The first end of said fiber is connected to means for introducing plane polarized light through 52 into said end; means 52, which may be a micropolarizer, is be connected to optical fiber core 46, whereby light is transmited to means 52 and thence to the first end of poled fiber 56.

The second end of said fiber 56 is connected to means for blocking light polarized in a certain manner that passes through it. In the embodiment shown in FIG. 3, micropolarizer 52 and microanalyzer 54 are crossed, that is, they are at 90 degrees relative to each other. Light rays which exit from the second end of poled fiber 56 which are at any angle except 90 degrees to the micropolarizer will pass through the microanalyzer. However, light rays at 90 degrees will not.

Electrically connected to said poled fiber 56 is means for introducing a modulated signal into poled fiber 56. Thus, referring to FIG. 3, a connection is fed from point 64 to electrode 58 and thence from electrode 60 to ground 62.

Figure 7:
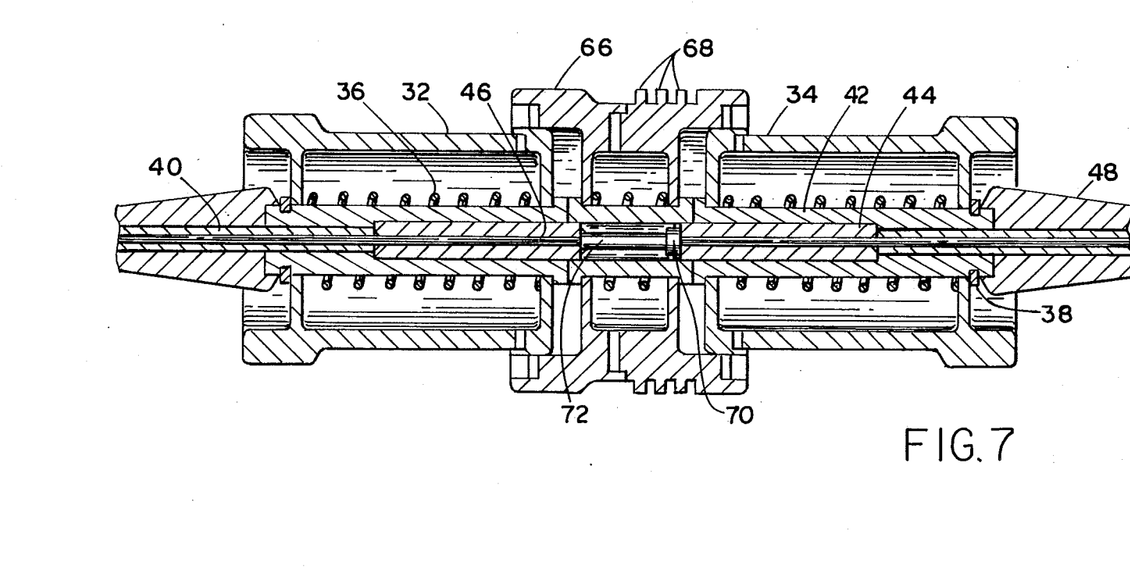
FIG. 7 is a schematic of a novel harmonic generation device in line with an optical fiber.

Another embodiment of applicants' invention is described in FIG. 7, which presents a schematic of a harmonic generation (HG) device in line with an optical fiber. The device of this figure is comprised of optical fiber receptacle 66, cooling fins 68, filter 70, and ferroelectric fiber with partially mirrored ends 72.

As is known to those skilled in the art, a fiber with mirrored ends may be prepared by evaporating metal on said ends. Thus, for example a metal or composition with some reflectivity can be deposited onto the ends of a fiber by evaporation. The reflective material chosen will depend upon the frequency of the input signal e.g. $ThF_4$, $SiO_2$ and the like.

In order to prepare a partially-mirrored coating on the ends of fiber 56, the thickness of the optical coating is controlled so that one can still transmit light through the coating. With a half-mirrored coating, half the incident light is reflected, and the other half goes through.

In the apparatus of FIG. 7, the first end of fiber 72 is connected to the core of an optical fiber. This optical fiber transmits light at a specified frequency "v" to said first end.

The partially-mirrored fiber 72 operates as an optical pump. The light which passes out of the second end of fiber 72 will be either at frequency v or some integral multiple of frequency v. The intensity of the light at frequency v will be greater than the intensity of light at frequncy 2 v, which in turn will be greater than the intensity of light at frequency 3 v, etc.

Connected to the second end of said fiber 72 is a filter designed to absorb light at frequency v. What will pass through the filter is light at frequecnyies 2 v, 3 v, 4 v, etc. Inasmuch as the light at 2 v has substantially greater intensity than the lgiht at 3 v et seq., this is primarily a second harmonic generator.

In another embodiment, the filter is a compound filter which absorbs the light at v and 2 v, thereby generating a dominant third harmonic.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

What is claimed is:

1. An inorganic, polycrystalline, ferroelectric fiber with a diameter of from about 1 micron to 1 millimeter, a porosity of less than about 40 percent, a density of at least about 60 percent of the theoretical density, and a carbonaceous material content of from about 0 to about 5 percent, wherein:
   (a) said fiber consists essentially of grains of which substantially 100 percent are from about 0.01 to about 5.0 microns in size, provided that the ratio of the size of the largest grain in said fiber to the size of the smallest grain in said fiber is no greater than about 10;
   (b) at least about 95 weight percent of said fiber consists of crystals of a formula selected from the group consisting of $ABO_3$, $(A_yA'_z[A''_w]_x)(B_2B'_8)O_{30}$, $A_aB_bO_c$, and mixtures thereof, wherein:
   1. A, A', and A'' are each atoms selected from the group consisting of lithium, sodium, potassium, lanthanum, gadolinium, calcium, strontium, barium, lead, bismuth, yttrium, cerium, praseodymium, neodymium, samarium, europium, terbium, dysprosium, holmium, and cadmium atoms, and mixtures thereof, provided that A'' differs from both A and A';
   2. x is from 0 to 1;
   3. w, y, and z are each positive numbers, wherein w is from 0 to 4, y is from 0 to 5, and z is from 0 to 5;
   4. a is from 2 to 9, b is from 1 to 8, and c is from 6 to 27; and
   5. B and B' are each atoms selected from the group consisting of titanium, zirconium, hafnium, vanadium, niobium, magnesium, tantalum, tungsten, molybdenum, tin, manganese, antimony, chromium, nickel, iron, zinc, scandium, silicon, germanium, tellurium, aluminum, and cobalt atoms, and mixtures thereof.

2. The fiber as recited in claim 1, wherein at least about 95 weight percent of said fiber consists of crystals of the formula $ABO_3$, and wherein said fiber is comprised of a solid solution of at least two of said B atoms and at least one of said A atoms.

3. The fiber as recited in claim 2, wherein said fiber is comprised of a solid solution of lead, zirconium, and titanium atoms.

4. The fiber as recited in claim 3, wherein said fiber consists of grains substantially 100 percent of which are from about 0.1 to about 0.3 microns in size.

5. The fiber as recited in claim 4, wherein the density of said fiber is at least about 90 percent of the theoretical density.

6. The fiber as recited in claim 5, wherein said fiber has a diameter of from about 10 to about 100 microns.

7. The fiber as recited in claim 6, wherein the density of said fiber is at least about 95 percent of the theoretical desity.

8. The fiber as recited in claim 7, wherein said fiber has a length of at least about 1 millimeter.

9. The fiber as recited in claim 8, wherein the ratio of the length of said fiber to its diameter is at least 100 to 1.

10. The fiber as recited in claim 9, wherein the diameter of said fiber is from about 25 to about 50 microns.

11. An electooptic modulator in line with an optical fiber, comprised of:
   (a) the ferroelectric fiber as recited in claim 1, wherein said fiber is comprised of a first end and a second end;
   (b) means for electrically poling said ferroelectric fiber;
   (c) means, connected to said fiber, for introducing plane polarized light into said first end of said fiber;
   (d) means, connected to said fiber, for blocking passage of light of specified polarization direction through said blocking means; and
   (e) means, electrically connected to said fiber, for introducing a modulated signal into said fiber.

12. The electrooptic modulator as recited in claim 11, wherein said ferroelectric fiber is the fiber recited in claim 3.

13. The electrooptic modulator as recited in claim 12, wherein said ferroelectric fiber is the fiber recited in claim 10.

14. A harmonic generator device in line with an optical fiber, comprised of:
(a) the ferroelectric fiber as recited in claim 1, wherein said fiber is comprised of a first end and a second end and both of said first end and said second end are partially mirrored;
(b) means for transmitting light at a specified frequency x into said first end of said fiber, wherein said light transmitting means are operatively connected to said first end of said fiber; and
(c) means for absorbing light at a specified frequency from passing through said light absorbing means, wherein said light absorbing means are operatively connected to said second end of said fiber.

15. The harmonic generation device as recited in claim 14, wherein said ferroelectric fiber is the fiber recited in claim 3.

16. The harmonic generation device as recited in claim 15, wherein said ferroelectric fiber is the fiber recited in claim 10.

17. A composite material, comprised of epoxy resin and the ferroelectric fiber recited in claim 1.

18. A composite material, comprised of polyurethane and the ferroelectric fiber recited in claim 1.

19. The ferroelectric fiber as recited in claim 2, wherein said fiber is comprised of at least one variable valence cation selected from the group consisting of cations of iron, manganese, tungsten, chromium, copper, nickel, vanadium, niobium, yttrium and the like.

20. The fiber as recited in claim 19, wherein said fiber has a porosity of from about 5 to about 40 percent.

* * * * *